(12) United States Patent
Cai et al.

(10) Patent No.: US 10,781,609 B2
(45) Date of Patent: Sep. 22, 2020

(54) ELECTRONIC DOOR OPENING/CLOSING APPARATUS AND ELECTRONIC DOOR OPENING/CLOSING DETECTION METHOD, APPARATUS AND DEVICE

(71) Applicant: ALIBABA GROUP HOLDING LIMITED, Grand Cayman (KY)

(72) Inventors: Wenzhou Cai, Hangzhou (CN); Pulin Wang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/822,902

(22) Filed: Mar. 18, 2020

(65) Prior Publication Data

US 2020/0232253 A1    Jul. 23, 2020

Related U.S. Application Data

(63) Continuation of application No. PCT/CN2020/071569, filed on Jan. 11, 2020.

(30) Foreign Application Priority Data

Jul. 12, 2019  (CN) .......................... 2019 1 0630960

(51) Int. Cl.
  *E05B 47/00*  (2006.01)
  *E05B 65/00*  (2006.01)
  *G01D 5/12*   (2006.01)

(52) U.S. Cl.
  CPC .......... *E05B 47/0001* (2013.01); *E05B 65/00* (2013.01); *E05Y 2400/44* (2013.01);
  (Continued)

(58) Field of Classification Search
  None
  See application file for complete search history.

(56) References Cited

U.S. PATENT DOCUMENTS 4,770,452 A    9/1988 Petree, Jr.
5,347,755 A    9/1994 Jaster et al.
(Continued)

FOREIGN PATENT DOCUMENTS

CN    202467610 U    10/2012
CN    204492401 U    7/2015
(Continued)

OTHER PUBLICATIONS

First Search Report for Chinese Application No. 201910630960.9 dated May 6, 2020.
(Continued)

*Primary Examiner* — Thomas S McCormack
(74) *Attorney, Agent, or Firm* — Sheppard Mullin Richter & Hampton LLP

(57) ABSTRACT

An electronic door opening/closing apparatus and an electronic door opening/closing detection method, apparatus, and device are disclosed. The electronic door opening/closing apparatus includes: an electronic lock, disposed at a side-hinged door and configured to limit a turn of a door panel of the side-hinged door when the electronic lock is locked; a turning detector, disposed at the side-hinged door and configured to detect a turning parameter of the door panel of the side-hinged door to generate a turning parameter signal; a position detector, disposed at the side-hinged door and configured to generate a door state signal based on a position-approaching condition; and a main controller, configured to determine an open or closed state of the side-hinged door. The turning parameter signal is combined with the door state signal to accurately determine the open or closed state of the side-hinged door, and to effectively prevent malicious lock deception.

17 Claims, 6 Drawing Sheets

Consumer

Self-service vending machine

(52) U.S. Cl.
CPC ....... *E05Y 2400/45* (2013.01); *E05Y 2900/60* (2013.01); *G01D 5/12* (2013.01)

(56) References Cited

U.S. PATENT DOCUMENTS

| | | | |
|---|---|---|---|
| 6,145,918 | A | 11/2000 | Wilbanks, II |
| 6,308,644 | B1 | 10/2001 | Diaz |
| 6,556,889 | B2 | 4/2003 | Rudick et al. |
| 6,963,280 | B2 | 11/2005 | Eskildsen |
| 7,355,515 | B2 | 4/2008 | Lee et al. |
| 7,446,302 | B2 | 11/2008 | Mason et al. |
| 7,495,556 | B2 | 2/2009 | Eubelen et al. |
| 8,109,410 | B2 | 2/2012 | Collins et al. |
| 9,484,914 | B2 | 11/2016 | Pohl |
| 10,435,917 | B2 | 10/2019 | Nunez et al. |
| 10,443,287 | B2 | 10/2019 | Elie et al. |
| 2002/0167382 | A1 | 11/2002 | Manthey |
| 2014/0195041 | A1 | 7/2014 | Hoormann |
| 2018/0171696 | A1* | 6/2018 | Sakurai .............. E05F 15/40 |
| 2018/0186531 | A1* | 7/2018 | McBride ......... E05B 65/0075 |

FOREIGN PATENT DOCUMENTS

| | | |
|---|---|---|
| CN | 107675954 A | 2/2018 |
| CN | 207406153 U | 5/2018 |
| CN | 108222674 A | 6/2018 |
| CN | 207764895 U | 8/2018 |
| CN | 209015272 U | 6/2019 |
| EP | 1120526 A2 | 8/2001 |
| JP | 5351822 B2 | 11/2013 |
| JP | 2019204303 A | 11/2019 |
| KR | 20-2009-0002488 U | 3/2009 |
| WO | 2001046545 A2 | 6/2001 |
| WO | 2012054942 A1 | 5/2012 |

OTHER PUBLICATIONS

First Office Action for Chinese Application No. 201910630960.9 dated May 18, 2020.
Supplementary Search for Chinese Application No. 201910630960.9 dated Jul. 17, 2020.

* cited by examiner

ELECTRONIC DOOR OPENING/CLOSING APPARATUS AND ELECTRONIC DOOR OPENING/CLOSING DETECTION METHOD, APPARATUS AND DEVICE

CROSS-REFERENCE TO RELATED APPLICATION

This application is a continuation application of International Patent Application No. PCT/CN2020/071569, filed on Jan. 11, 2020, which is based on and claims priority of the Chinese Patent Application No. 201910630960.9, filed on Jul. 12, 2019. The above-referenced applications are incorporated herein by reference in their entirety.

TECHNICAL FIELD

This specification relates to the field of Internet of Things (IoT) technologies, and more specifically, to an electronic door opening/closing apparatus and an electronic door opening/closing detection method, apparatus, and device.

BACKGROUND

With rapid development in the Internet of Things technology, unattended self-service vending devices capable of selling commodities to consumers around the clock have been widely deployed. A self-service vending device is usually provided with a two-dimensional code or a camera, so that, when a consumer logs in through code scanning or biological recognition, a device door is opened to allow the consumer to select a commodity, and the self-service vending device may perform a checkout operation after detecting that the consumer has closed the device door. However, some consumers may maliciously conduct deceptive device door operations. That is, after logging in to open the device door, the consumers may provide a maliciously deceive the self-service vending device so that the self-service vending device may consider the device door has been closed, while the device door is actually open. As a result, the commodities in the self-service vending device may be stolen, causing loss to the merchant.

SUMMARY

One or more embodiments of this specification aim to provide an electronic door opening/closing apparatus, and an electronic door opening/closing detection method, apparatus, and device. An open or closed state of a side-hinged door can be accurately determined according to a turning parameter signal generated by a turning detector and a door state signal generated by a position detector, thereby effectively preventing malicious lock deception and protecting the interests of merchants.

This description first provides an electronic door opening/closing apparatus, applicable to a side-hinged door. The apparatus may include an electronic lock, a turning detector, a position detector, and a main controller.

The electronic lock may be disposed at the side-hinged door and configured to limit a turn of a door panel of the side-hinged door when the electronic lock is locked. The turning detector may be disposed at the side-hinged door, and configured to detect a turning parameter of the door panel of the side-hinged door with respect to a door frame of the side-hinged door so as to generate a turning parameter signal. The position detector may be disposed at the side-hinged door and configured to generate a first door state signal if a position-approaching condition is met, or generate a second door state signal if the position-approaching condition is not met. The main controller may be configured to determine whether the side-hinged door is in an open state or a closed state according to the turning parameter signal and the first or the second door state signal generated by the position detector.

This specification further provides an electronic door opening/closing detection method, applicable to a side-hinged door with an electronic lock. The method may include: obtaining a turning parameter signal and a door state signal of the side-hinged door, wherein the door state signal may be a first door state signal or a second door state signal, and the turning parameter signal may be generated from a turning detector disposed at the side-hinged door and configured to detect a turning parameter of a door panel of the side-hinged door with respect to a door frame of the side-hinged door, the door state signal may be generated by a position detector disposed at the side-hinged door, and configured to generate the first door state signal if a position-approaching condition is met, or generate the second door state signal if the position-approaching condition is not met; and determining that the side-hinged door is in an open state or a closed state according to the turning parameter signal and the door state signal generated by the position detector.

This specification further provides an electronic door opening/closing detection apparatus, applicable to a side-hinged door with an electronic lock. The apparatus may include an obtaining component and a detection component.

The obtaining component may be configured to obtain a turning parameter signal and a door state signal of the side-hinged door, wherein the door state signal may be a first door state signal or a second door state signal, the turning parameter signal may be generated from a turning detector disposed at the side-hinged door and configured to detect a turning parameter of a door panel of the side-hinged door with respect to a door frame of the side-hinged door; the door state signal may be generated from a position detector disposed at the side-hinged door, and configured to generate the first door state signal if a position-approaching condition is met or generate the second door state signal if the position-approaching condition is not met. The detection component may be configured to determine that the side-hinged door is in an open state or a closed state according to the turning parameter signal and the door state signal generated by the position detector.

This specification further provides an electronic door opening/closing detection device. The detection device comprises a processor, and a memory configured to store computer executable instructions. Upon being executed, the computer executable instructions may enable the processor to perform the above-described electronic door opening/closing detection method.

This specification further provides an electronic door opening/closing detection apparatus, applicable to a side-hinged door with an electronic lock. The apparatus may include one or more processors and a non-transitory computer-readable storage medium storing a computer program executable by the one or more processors. Upon being executed by the one or more processors, the computer program may cause the one or more processors to perform any one of the above-described electronic door opening/closing detection methods.

The one or more embodiments of this specification provide a storage medium, which is configured to store computer executable instructions. Upon being executed, the computer executable instructions may perform the above-described electronic door opening/closing detection method.

According to the electronic door opening/closing apparatus, and the electronic door opening/closing detection method, apparatus, and device in the one or more embodiments of this specification, a turning detector and a position detector are disposed, wherein the turning detector detects a turning parameter of a door panel with respect to a door frame so as to generate a turning parameter signal, and the position detector generates a first door state signal if a position-approaching condition is met or generate a second door state signal if the position-approaching condition is not met. Therefore, an open or closed state of a side-hinged door can be accurately determined according to the turning parameter signal and the door state signal. For a self-service scenario of a self-service vending device, the occurrence of malicious lock deception can be effectively prevented, and the interests of merchants can be protected.

BRIEF DESCRIPTION OF THE DRAWINGS

To illustrate the technical solutions in one or more embodiments of this specification or in the current technologies more clearly, the following briefly introduces the accompanying drawings to be used in descriptions of the embodiments or the current technologies. Obviously, the accompanying drawings in the following description are merely some embodiments recorded in this specification. Those skilled in the art may still derive other accompanying drawings according to these accompanying drawings without creative efforts.

Figure 1:
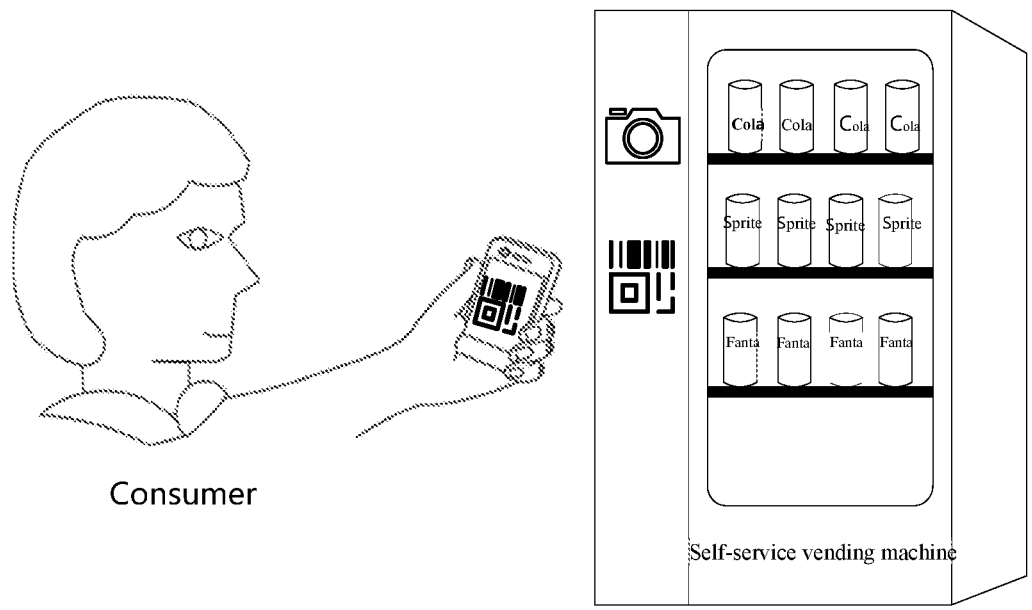
FIG. 1 shows a schematic diagram of a self-service vending scenario of a self-service vending machine provided by one or more embodiments of this specification.

The reference numerals in the accompanying drawings are described as below:

10-1: door panel; 10-2: door frame; 10-3: door shaft; 11: electronic lock; 12: turning detector; 13-1: magnetic sensor; and 13-2: magnetic panel.

DETAIL DESCRIPTION OF THE EMBODIMENTS

In order to enable those skilled in the art to better understand the technical solutions in one or more embodiments of this specification, the technical solutions in the one or more embodiments of this specification are described below clearly and completely in combination with the accompanying drawings in the one or more embodiments of this specification. Obviously, the described embodiments are merely some but not all of the embodiments of this specification. Based on the one or more embodiments of this specification, all other embodiments obtainable by those skilled in the art without creative efforts shall fall within the scope of protection of this specification.

In this specification, a self-service vending machine is used as an example for the self-service vending device for description. FIG. 1 shows a schematic diagram of a self-service vending scenario of the self-service vending machine. A consumer may log in through code scanning or image acquisition. Upon obtaining the login information of the consumer, a host computer may control the self-service vending machine to unlock a door. Then, the consumer can open a machine door to select a commodity from the self-service vending machine, and close the machine door when the selection is completed. Upon detecting that the machine door has been closed, the self-service vending machine may send a machine door closing message to the host computer. The host computer may perform a checkout operation, and send a locking instruction to the self-service vending machine to lock the door after the checkout operation is completed. Here, the self-service vending machine may determine an open or closed state of the machine door according to a door state signal generated by a position detector disposed thereon. For example, the position detector may include a magnetic sensor disposed at a machine body and a magnetic panel disposed at a machine door. When a distance between the magnetic sensor and the magnetic panel is smaller than a preset distance, the position detector may generate a first door state signal. When the distance between the magnetic sensor and the magnetic panel is not smaller than the preset distance, the position detector may generate a second door state signal. Accordingly, when the position detector generates a first door state signal, it may be determined that the machine door of the self-service vending machine is in a closed state; and when the position detector generates a second door state signal, it may be determined that the door of the self-service vending machine is in an open state.

This method of determining the open or closed state of the machine door of the self-service vending machine, however, is susceptible to malicious lock deception. That is, after logging in through code scanning or image acquisition and opening the machine door, a user may hold an object, such as an iron panel capable of substituting for the magnetic panel, and move the object close to the magnetic sensor, so as to cause the position detector to generate the first door state signal. Thus, the self-service vending machine may consider that the machine door is in a closed state, and send a machine door closing message to the host computer. A checkout total calculated by the host computer may show no balance, and the checkout result may then be sent to the user. However, at this time, the machine door of the self-service vending machine is actually not closed, and the user can take away commodities from the self-service vending machine at will without paying, resulting in the loss to the merchants.

Based on this, one or more embodiments of this specification provide an electronic door opening/closing apparatus, and an electronic door opening/closing detection method, apparatus, and device. The electronic door opening/closing apparatus is provided with a turning detector in addition to the above-described position detector, such that an open or closed state of a side-hinged door can be accurately determined according to a turning parameter signal generated by the turning detector and a door state signal generated by the position detector. Therefore, malicious lock deception may be effectively prevented, thereby protecting the interests of merchants.

Figure 2:
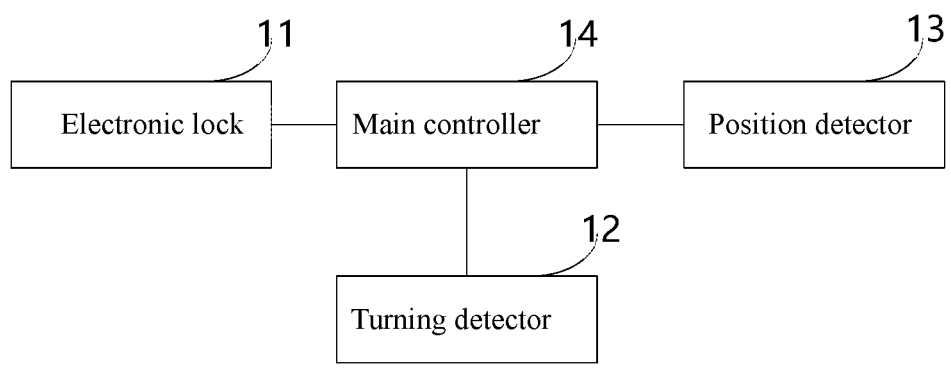
FIG. 2 is a block diagram illustrating components of an electronic door opening/closing apparatus provided by one or more embodiments of this specification.

FIG. 2 is a schematic diagram of component composition of an electronic door opening/closing apparatus provided by one or more embodiments of this specification. The electronic door opening/closing apparatus is applicable to a side-hinged door. To facilitate the description, a door panel of the side-hinged door is marked as 10-1, a door frame of the side-hinged door is marked as 10-2, and a door shaft of the side-hinged door is marked as 10-3. As shown in FIG. 2, the electronic door opening/closing apparatus comprises an electronic lock 11, a turning detector 12, a position detector 13, and a main controller 14.

The electronic lock 11 may be disposed at the side-hinged door and configured to limit a turn of the door panel 10-1 of the side-hinged door when an electronic lock 11 is locked. The turning detector 12 may be disposed at the side-hinged door and configured to detect a turning parameter of the door panel 10-1 of the side-hinged door with respect to the door frame 10-2 of the side-hinged door so as to generate a turning parameter signal. The turning parameter signal may indicate the turning parameter. The position detector 13 may be disposed at the side-hinged door and configured to generate a first door state signal if a position-approaching condition is met, or generate a second door state signal if the position-approaching condition is not met. The main controller 14, for example, a controller, may be configured to determine that the side-hinged door is in an open state or a closed state according to the turning parameter signal generated by the turning detector 12 and the door state signal generated by the position detector 13.

In one or more embodiments of this specification, the turning detector and the position detector may be disposed at the electronic door opening/closing apparatus. The turning detector may detect a turning parameter of a door panel of a side-hinged door with respect to a door frame of the side-hinged door so as to generate a turning parameter signal, and the position detector may generate a first door state signal if a position-approaching condition is met, or generate a second door state signal if the position-approaching condition is not met. Therefore, an open or closed state of the side-hinged door can be accurately determined according to the turning parameter signal and the door state signal. For a self-service vending device in a self-service vending scenario, malicious lock deception can be effectively prevented, thereby protecting the interests of merchants.

In one or more embodiments of this specification, the position detector 13 may include a magnetic detector. The magnetic detector may include a magnetic sensor 13-1 and a magnetic panel 13-2.

The magnetic sensor 13-1 may be disposed at the door frame 10-2 of the side-hinged door or a physical body including the electronic door opening/closing apparatus. The magnetic panel 13-2 may be disposed at the door panel 10-1 of the side-hinged door. If the distance between the magnetic sensor 13-1 and the magnetic panel 13-2 is smaller than a preset distance, the magnetic detector may generate a first door state signal. If the distance between the magnetic sensor 13-1 and the magnetic panel 13-2 is not smaller than the preset distance, the magnetic detector may generate a second door state signal.

Here, the physical body including the electronic door opening/closing apparatus may be, for example, a self-service vending machine. The magnetic sensor 13-1 may be disposed at a machine body of the self-service vending machine. When the distance between the door panel 10-1 and the machine body is smaller than a preset distance (i.e., when the distance between the magnetic sensor 13-1 and the magnetic panel 13-2 is smaller than the preset distance), the magnetic detector may generate the first door state signal, indicating that the side-hinged door is in a closed state. When the distance between the door panel 10-1 and the machine body is not smaller than the preset distance (i.e., when the distance between the magnetic sensor 13-1 and the magnetic panel 13-2 is not smaller than the preset distance), the magnetic detector may generate the second door state signal, indicating that the side-hinged door is in an open state.

Since the position detector 13 is similar to a magnetic sensor in an existing self-service vending machine, malicious lock deception may still happen. Therefore, in the embodiments of this specification, the electronic door opening/closing apparatus may be further provided with the turning detector 12, so as to accurately determine the open or closed state of the side-hinged door through the combination of the position detector and the turning detector, thereby avoiding the occurrence of the malicious lock deception.

Further, the main vulnerability of existing technology that may be exploited by a lock fraud attempt is that the magnetic sensor located on the machine body of the self-service vending machine is accessible by a consumer. Based on this, referring to a structural schematic diagram of the door panel 10-1 of the side-hinged door with respect to the door frame 10-2 shown in FIG. 3, in one or more embodiments of this specification, the turning detector 12 may be disposed at the door shaft 10-3 of the side-hinged door. Because the door shaft 10-3 is not accessible by the consumer, the consumer cannot perform a deceptive operation on the turning detector 12, which further prevents the malicious lock deception. It should be noted that a specific position of the turning detector 12 on the door shaft 10-3 of the side-hinged door may be set according to specific requirements in actual applications, and is not limited in this specification.

In one or more embodiments of this specification, the turning detector 12 may be an angle sensor used for detecting a turning angle of the door panel 10-1 with respect to the door frame 10-2, so as to generate a turning angle signal. The turning detector 12 may be a gyroscope used for detecting an angular velocity of the door panel 10-1 with respect to the door frame 10-2, so as to generate a turning angular velocity signal. The turning detector 12 may be a linear velocity sensor used for detecting a linear velocity of the door panel 10-1 with respect to the door frame 10-2, so as to generate a turning linear velocity signal.

To accommodate the possibility that there may be an error in the turning parameter of the door panel 10-1 with respect to the door frame 10-2 detected by the turning detector 12, and to minimize the impact of an erroneous determination result of an open or closed state of the side-hinged door, the one or more embodiments of this specification preset an allowable parameter range.

Accordingly, the main controller 14 may determine that, when the turning parameter is within the preset parameter range, the side-hinged door is in the closed state and the position detector 13 may generate a first door state signal. The main controller 14 may determine that, when the turning parameter is not within the preset parameter range, the side-hinged door is in the open state and the position detector 13 may generate a second door state signal. For example, the turning parameter may be a turning angle, and the preset parameter range may be 0-0.5 degree.

Upon determining the open or closed state of the side-hinged door, an open or closed state of the electronic lock 11 may further be detected in order to lock or unlock the electronic lock 11. The electronic lock 11 may be an electronically controlled lock that can drive, through a driving current, a bolt of the electronic lock to extend and retract so as to lock or unlock. The electronic lock 11 may be disposed at the door panel 10-1 or the door frame 10-2, and can be disposed according to specific requirements in actual applications.

Figure 4:
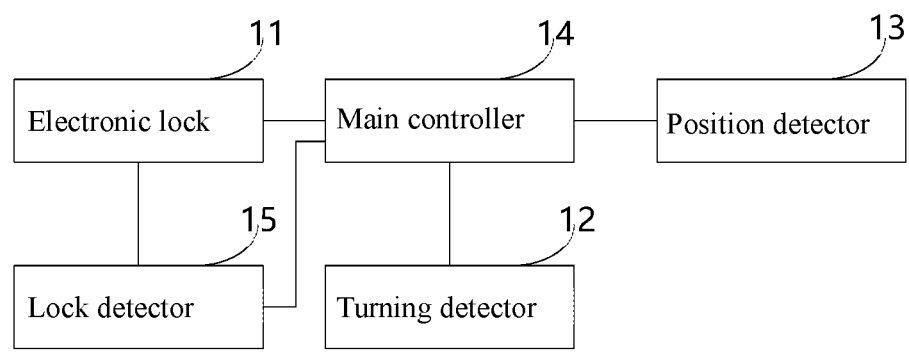
FIG. 4 is a block diagram illustrating components of an electronic door opening/closing apparatus provided by one or more embodiments of this specification.

Accordingly, as shown in FIG. 4, the electronic door opening/closing apparatus may further include a lock detector 15. The lock detector 15 may be disposed at the side-hinged door or the electronic lock 11, and be configured to generate a first lock state signal if the bolt of the electronic lock 11 is in an extended state, or generate a second lock state signal if the bolt of the electronic lock 11 is in a retracted state. The electronic lock 11 may be in a locked state when the bolt is in an extended state, and in a unlocked state when the bolt is in a retracted state.

Accordingly, the main controller 14 may determine an open or closed state of the side-hinged door according to the turning parameter signal, the door state signal generated by the position detector 13, and the lock state signal generated by the lock detector 15.

For example, the main controller 14 may determine that the side-hinged door is in a closed state when the turning parameter is within the preset parameter range, the position detector 13 generates the first door state signal, and the lock detector 15 generates the first lock state signal. The main controller 14 may determine that the side-hinged door is in an open state when the turning parameter is not within the preset parameter range, the position detector 13 generates the second door state signal. and the lock detector 15 generates the second lock state signal.

Therefore, in addition to combining the turning parameter signal generated by the turning detector 12 and the door state signal generated by the position detector 13, the main controller 14 may further incorporate the lock state signal generated by the lock detector 15 to further improve the accuracy of the determination of the open or closed state of the side-hinged door, thereby effectively preventing lock deception.

Further, in order to achieve the unlocking and locking of the electronic lock 11 to allow or restrain the turning of the door panel 10-1, the main controller 14 may, upon receiving an unlocking request and determining that the electronic lock 11 is locked and the side-hinged door is in the closed state, send an unlocking signal to the electronic lock 11 to unlock the electronic lock 11.

For example, for a self-service vending machine in a self-service vending scenario, when a consumer logs in through code scanning or image acquisition, a host computer may obtain login information of the consumer, and send an unlocking request to the main controller 14. The main controller 14 may receive the unlocking request sent by the host computer, and obtain the turning parameter signal generated by the turning detector 12, the door state signal generated by the position detector 13, and the lock state signal generated by the lock detector 15. If the turning parameter corresponding to the obtained turning parameter signal is within the preset parameter range, the door state signal is the first door state signal, and the lock state signal is the first lock state signal, then it may be determined that the electronic lock 11 is locked and the side-hinged door is in the closed state. The unlocking signal may be sent to the electronic lock 11 to unlock the electronic lock 11, and the door panel 10-1 may be enabled to turn with respect to the door frame 10-2. Thus, the consumer can turn the door panel 10-1 and open the door to select a commodity. In order to increase the unlocking speed, the main controller 14 may also obtain the turning parameter signal generated by the turning detector 12 and the lock state signal generated by the lock detector 15. When the main controller 14 receives the unlocking request sent by the host computer and if the turning parameter corresponding to the obtained turning parameter signal is within the preset parameter range and the lock state signal is the first lock state signal, it may be determined that the electronic lock 11 is locked and the side-hinged door is in the closed state, and the unlocking signal may be sent to the electronic lock 11 to unlock the electronic lock 11.

Therefore, based on the unlocking request sent by the host computer, the unlocking of the electronic lock 11 may be controlled in combination with a locked or unlocked state of the electronic lock 11 and an open or closed state of the side-hinged door, thereby ensuring the unlocking security. This is especially important for the self-service vending device in the self-service vending scenario; problems such as commodity loss can be avoided, and the interests of merchants may be protected.

Further, upon receiving a locking request and determining that the electronic lock 11 is locked and the side-hinged door is in a closed state, the main controller 14 may send a locking signal to the electronic lock 11 to lock the electronic lock 11.

For example, after selecting a commodity from the self-service vending device, the consumer may close the side-hinged door. When determining that the side-hinged door is in a closed state, the main controller 14 may send closing information of the side-hinged door to the host computer. The host computer may detect the commodity selected by the consumer in the self-service vending machine, perform checkout, and send the locking request to the main controller 14 when the checkout is completed. The main controller 14 may receive the locking request sent by the host computer, and obtain the turning parameter signal generated by the turning detector 12, the door state signal generated by the position detector 13, and the lock state signal generated by the lock detector 15. If the turning parameter corresponding to the obtained turning parameter signal is within the preset parameter range, the door state signal is the first door state signal, and the lock state signal is the second lock state signal, it may be determined that the electronic lock 11 is unlocked and the side-hinged door is in a closed state. The locking signal may be sent to the electronic lock 11 to lock the electronic lock 11, thereby limiting the turning of the door panel 10-1. The consumer can only turn the door panel 10-1 (i.e., open the door to select a commodity) after re-logging in. In order to increase the unlocking speed, the main controller 14, upon receiving the locking request sent by the host computer, may obtain the turning parameter signal generated by the turning detector 12 and the lock state signal generated by the lock detector 15. If the turning parameter corresponding to the obtained turning parameter signal is within the preset parameter range and the lock state signal is the second lock state signal, it may be determined that the electronic lock 11 is unlocked and the side-hinged door is in a closed state, and the unlocking signal may be sent to the electronic lock 11 to unlock the electronic lock 11.

Therefore, based on the locking request sent by the host computer, closing of the electronic lock 11 may be controlled in combination with an open or closed state of the electronic lock 11 and an open or closed state of the side-hinged door, thereby ensuring the locking security. This is especially important for the self-service vending device in the self-service vending scenario. The embodiment ensures that the host computer provides an overall and orderly management on each self-service vending device, and further prevents unauthorized user from opening the side-hinged door, thereby ensuring the commodity safety and protecting the interests of merchants.

In the one or more embodiments of this specification, the turning detector and the position detector may be disposed at the electronic door opening/closing apparatus, so as to accurately determine an open or closed state of the side-hinged door according to the turning parameter signal and the door state signal. The turning detector may detect the turning parameter of the door panel of the side-hinged door with respect to the door frame of the side-hinged door so as to generate the turning parameter signal, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

It should be noted that the electronic door opening/closing apparatus in the embodiments of this specification may be applicable not only to the self-service vending device but also to a home environment. The corresponding host computer may be a terminal device of a user, so as to determine an open or closed state of the side-hinged door, the open or closed state may be sent to the terminal device of the user, so as to prevent the theft due to unintentionally-open door.

Figure 3:
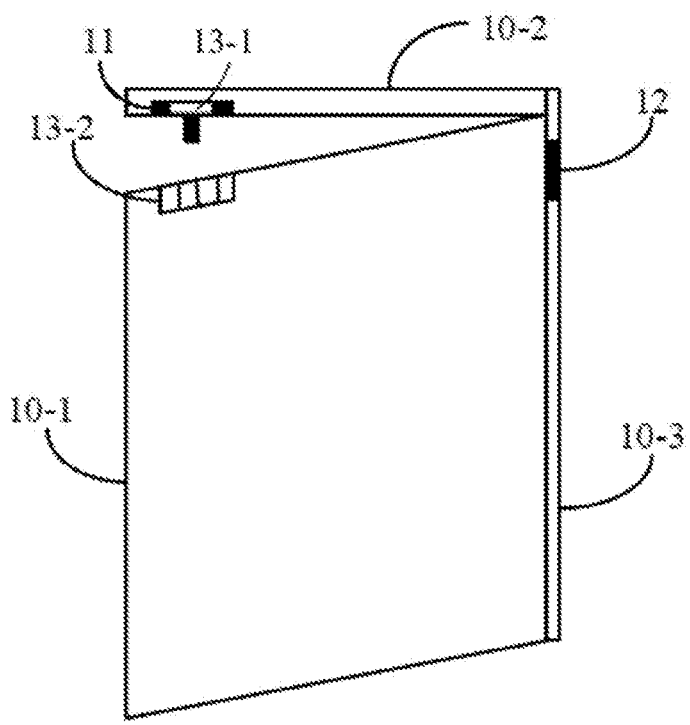
FIG. 3 shows a structural diagram of a door panel of a side-hinged door turning with respect to a door frame provided by one or more embodiments of this specification.
Figure 5:
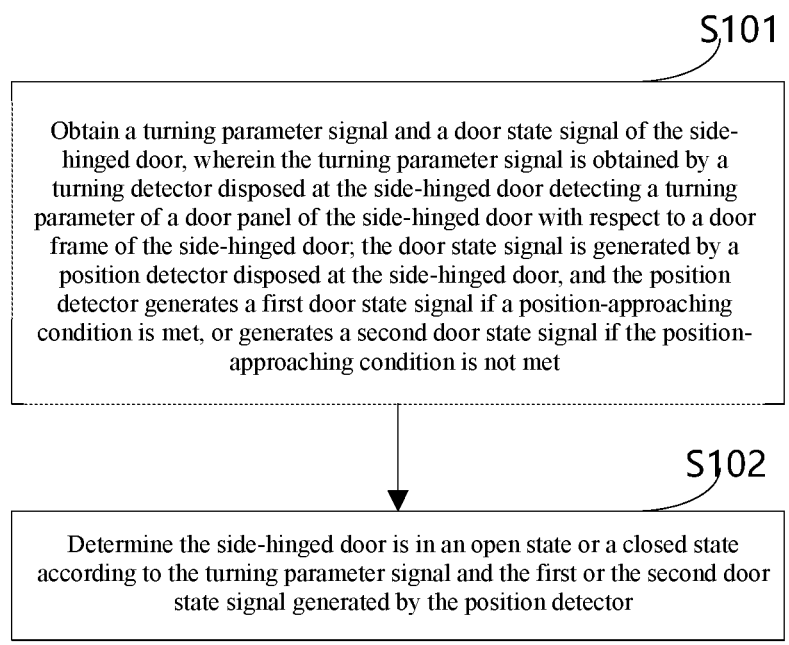
FIG. 5 is a flow chart illustrating an electronic door opening/closing detection method provided by one or more embodiments of this specification.

Corresponding to the electronic door opening/closing apparatus described in the above FIGS. 2, 3, and 4, and based on the same technical concept, this specification further provides an electronic door opening/closing detection method. FIG. 5 is a schematic flow chart of the electronic door opening/closing detection method provided by one or more embodiments of this specification, and the detection method is applicable to a side-hinged door with an electronic lock. As shown in FIG. 5, the method include the following steps S101 and S102.

In step S101, a turning parameter signal and a door state signal of the side-hinged door may be obtained. The turning parameter signal may be generated by a turning detector disposed at the side-hinged door detecting a turning parameter of a door panel of the side-hinged door with respect to a door frame of the side-hinged door. The door state signal may be a first door state signal or a second door state signal. The door state signal may be generated by a position detector disposed at the side-hinged door, and the position detector may generate the first door state signal if a position-approaching condition is met, or generate the second door state signal if the position-approaching condition is not met.

The turning parameter signal may be a turning angle signal of the door panel with respect to the door frame, a turning angular velocity signal of the door panel with respect to the door frame, or a turning linear velocity signal of the door panel with respect to the door frame.

In step S102, an open or closed state of the side-hinged door may be determined according to the turning parameter signal and the door state signal generated by the position detector.

In one or more embodiments of this specification, the turning parameter signal and the door state signal of the side-hinged door may be obtained so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door, the door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

The main vulnerability of existing technology that may be exploited by a lock fraud attempt is that a detector located in the self-service vending machine is accessible by a consumer. Based on this, in one or more embodiments of this specification, the turning detector is disposed at the door shaft of the side-hinged door. Because the door shaft is not accessible by the consumer, the consumer cannot perform a deceptive operation on the turning detector, which further prevents the malicious lock deception. It should be noted that a specific position of the turning detector on the door shaft of the side-hinged door can be set according to specific requirements in actual applications.

To accommodate the possibility that there may be an error in the turning parameter of the door panel of the side-hinged door with respect to the door frame of the side-hinged door detected by the turning detector, and to minimize the impact of erroneous determination result an open or closed state of the side-hinged door, one or more embodiments of this specification can preset an allowable parameter range.

Correspondingly, step S102 may include: if the turning parameter is within the preset parameter range and the position detector generates the first door state signal, determining that the side-hinged door is in a closed state; and if the turning parameter is not within the preset parameter range and the position detector generates the second door state signal, determining that the side-hinged door is in an open state.

For example, the turning parameter may be a turning angle, and the preset parameter range may be 0-0.5 degree. If the turning angle is 0.1 degree and the position detector generates the first door state signal, it may be determined that the side-hinged door is in a closed state.

In one or more embodiments of this specification, in order to improve the accuracy of a result of the detection of the open or closed state of the side-hinged door, the method may further include the following steps before step S102: obtaining a lock state signal, wherein the lock state signal is generated by a lock detector disposed at the side-hinged door or the electronic lock. The lock detector may generate the first lock state signal if a bolt of the electronic lock is in an extended state or generate the second lock state signal if the bolt of the electronic lock is in a retracted state. The electronic lock may be in a locked state when the bolt is in an extended state, and in a unlocked state when the bolt is in a retracted mode.

Correspondingly, step S102 may include: determining the side-hinged door is in an open state or a closed state according to the turning parameter signal, the door state signal generated by the position detector, and the lock state signal generated by the lock detector.

For example, when the turning parameter is within the preset parameter range, the position detector generates the first door state signal, and the lock detector generates the first lock state signal, it may be determined that the side-hinged door is in the closed state. When the turning parameter is not within the preset parameter range, the position detector generates the second door state signal, and the lock detector generates the second lock state signal, it may be determined that the side-hinged door is in the open state.

Therefore, in addition to combining the turning parameter and the door state signal, the lock state signal may also be combined to further improve the accuracy of the determination of the open or closed state of the side-hinged door, thereby effectively preventing lock deception.

In one or more embodiments of this specification, upon determining the open or closed state of the side-hinged door, the lock and unlock of the electronic lock may further be controlled. Correspondingly, the method may further include: upon receiving a unlocking request and determining that the electronic lock is lock and the side-hinged door is in a closed state, sending an unlocking signal to the electronic lock to unlock the electronic lock.

Figure 6:
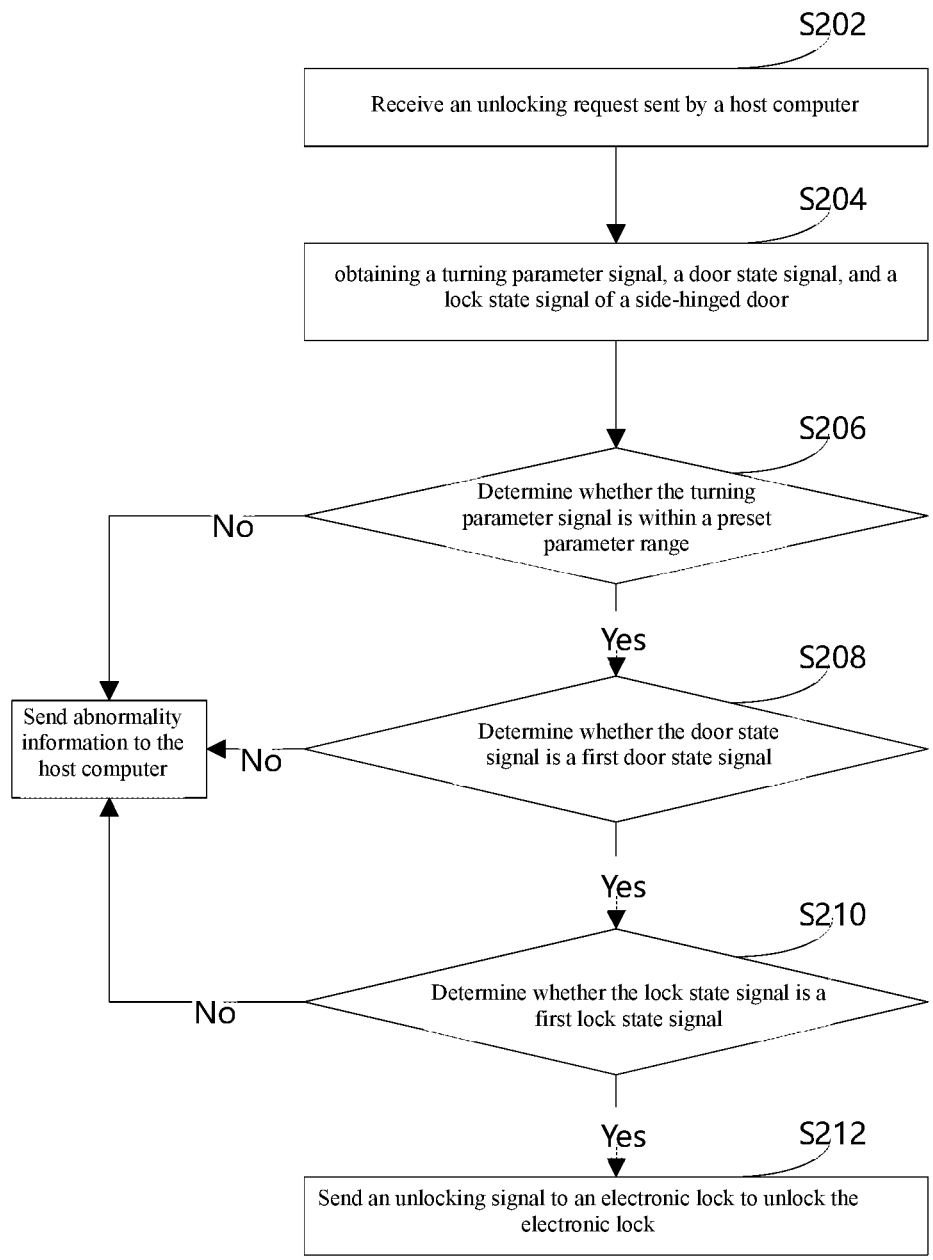
FIG. 6 is a flow chart illustrating an unlocking process provided by one or more embodiments of this specification.

FIG. 6 is a schematic diagram of an unlocking process provided by the one or more embodiments of this specification, and may be referred to for a specific unlocking process of the electronic lock. As shown in FIG. 6, the unlocking process may include the following steps S202 through S212.

In step S202, an unlocking request sent by a host computer may be received.

In step S204, a turning parameter signal, a door state signal, and a lock state signal of a side-hinged door may be obtained.

In step S206, whether the turning parameter signal is within a preset parameter range may be determined. If it is, step S208 may be performed; otherwise, abnormality information may be sent to the host computer.

In step S208, whether the door state signal is a first door state signal may be determined. If it is, step S210 may be performed, otherwise, abnormality information may be sent to the host computer.

Here, the door state signal may be represented by numbers 0 and 1. For example, if the first door state signal is represented by 1 and the second door state signal is represented 0, whether the obtained door state signal is 1 may be determined. If the door state signal is 1, it is determined that the obtained door state signal is the first door state signal. Otherwise, it is determined that the obtained door state signal is not the first door state signal.

In step S210, whether the lock state signal is the first lock state signal may be determined. If it is, step S212 may be performed. Otherwise, abnormality information may be sent to the host computer.

Here, the door state signal may also be represented by numbers 0 and 1. For example, if the first lock state signal is represented by 1 and the second lock state signal is represented by 0, by whether the obtained lock state signal is 1 may be determined. If it is 1, it is determined that the obtained lock state signal is the first lock state signal. Otherwise, it is determined that the obtained lock state signal is not the first lock state signal.

In step S212, an unlocking signal may be sent to an electronic lock to unlock the electronic lock.

When the electronic lock receives the unlocking signal, a bolt may be retracted. In other words, the bolt may change from an extended state to a retracted state.

Therefore, on the basis of the unlocking request sent by the host computer, opening of the electronic lock is controlled in combination with an open or closed state of the electronic lock and an open or closed state of the side-hinged door, thereby ensuring the unlocking security. This is especially important in the self-service vending device in the self-service vending scenario, problems such as commodity loss are avoided, and interests of merchants are protected.

It should be noted that the execution order of the above-described steps S206, S208, and S210 may be changed, and the steps may be implemented simultaneously. Further, in order to increase the unlocking speed, in one or more embodiments of this specification, only the turning parameter signal and the lock state signal of the side-hinged door may be obtained in step S204. If the turning parameter is within the preset parameter range and the lock state signal is the first lock state signal, an unlocking signal may be sent to the electronic lock to unlock the electronic lock.

In consideration of the self-service vending device in the self-service vending scenario, a user may need to lock the electronic lock after purchasing a commodity, so as to ensure that the side-hinged door cannot be opened at will by unauthorized user. Based on this, in one or more embodiments of this specification, the method further include: upon receiving a locking request and determining that the electronic lock is open and the side-hinged door is in a closed state, sending a locking signal to the electronic lock to lock the electronic lock.

Figure 7:
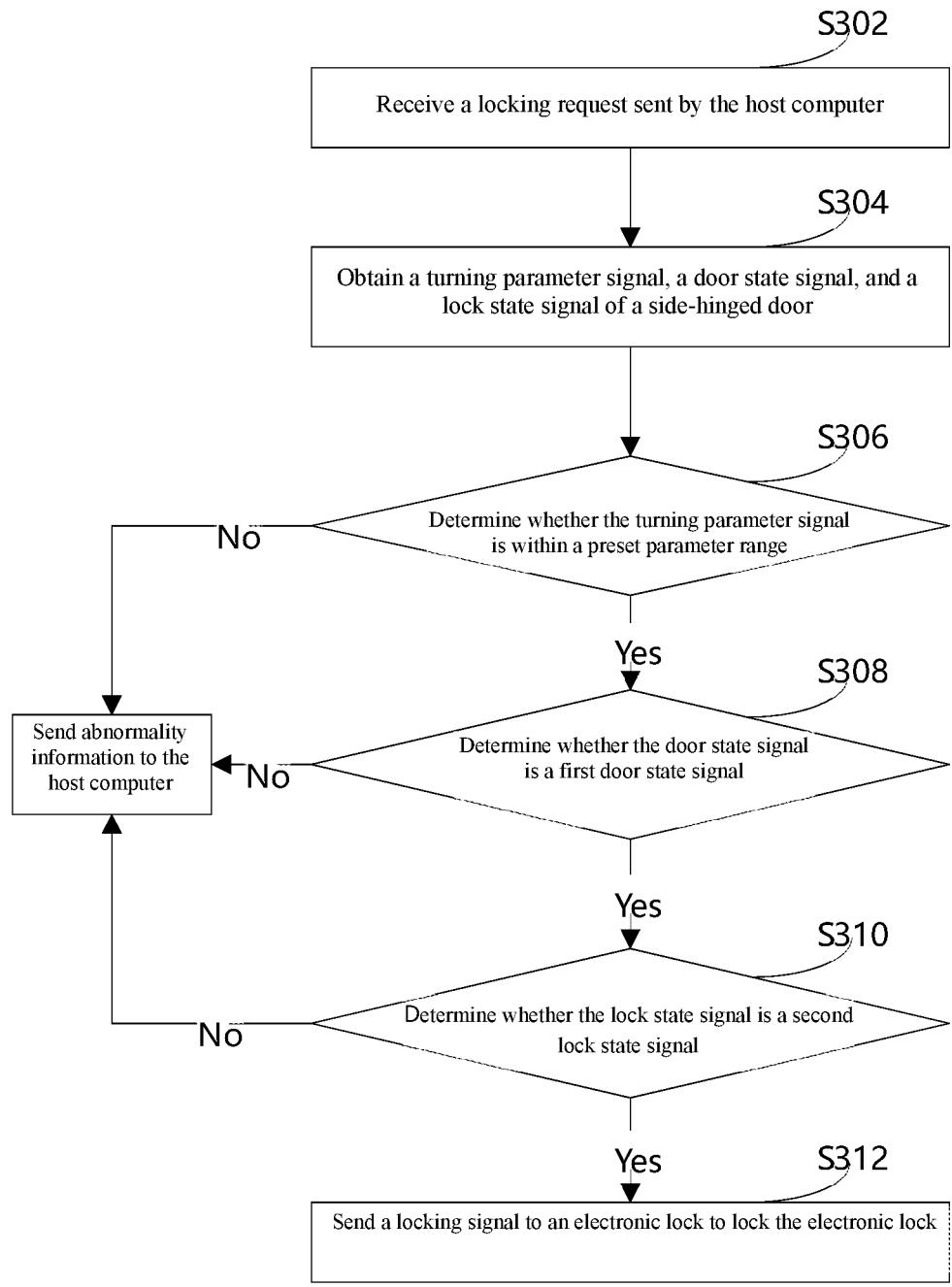
FIG. 7 shows a flow chart illustrating a locking process provided by one or more embodiments of this specification.

FIG. 7 is a schematic diagram of a locking process provided by one or more embodiments of this specification, and can be referred to for a specific locking process of the electronic lock. As shown in FIG. 7, the locking process may include the following steps S302 through S312.

In step S302, a locking request sent by a host computer may be received.

In step S304, a turning parameter signal, a door state signal, and a lock state signal of a side-hinged door may be obtained.

In step S306, whether the turning parameter signal is within a preset parameter range may be determined. If it is, step S308 may be performed. Otherwise, abnormality information may be sent to the host computer.

In step S308, whether the door state signal is a first door state signal may be determined. If it is, step S310 may be performed. Otherwise, abnormality information may be sent to the host computer.

Here, the door state signal may be represented by numbers 0 and 1. For example, if the first door state signal is represented by 1 and a second door state signal is represented by 0, whether the obtained door state signal is 1 may be determined. If the door signal is 1, it is determined that the obtained door state signal is the first door state signal. Otherwise, it is determined that the obtained door state signal is not the first door state signal.

In step S310, whether the lock state signal is a second lock state signal may be determined. If it is, step S212 may be performed. Otherwise, abnormality information may be sent to the host computer.

The lock state signal may also be represented by numbers 0 and 1. For example, if a first lock state signal is 1 and the second lock state signal is 0, whether the obtained lock state signal is 0 may be determined. If the lock state signal is 0, it is determined that the obtained lock state signal is the second lock state signal. Otherwise, it is determined that the obtained lock state signal is not the second lock state signal.

In step S312, a locking signal may be sent to an electronic lock to lock the electronic lock.

When the electronic lock receives the locking signal, a bolt may be extended. In other words, the bolt may change from a retracted state to an extended state.

Therefore, based on the locking request sent by the host computer, closing of the electronic lock may be controlled in combination with an open or closed state of the electronic lock and an open or closed state of the side-hinged door, thereby ensuring the locking security. This is especially important for the self-service vending device in the self-service vending scenario. The embodiment ensures that the host computer provides an overall and orderly management on each self-service vending device, and further prevents unauthorized user from opening the side-hinged door, thereby ensuring the commodity safety and protecting the interests of merchants.

It should be noted that the execution order of the above-described steps S306, S308, and S310 may be changed, and the steps may be implemented simultaneously. In order to increase the locking speed, only the turning parameter signal and the lock state signal of the side-hinged door may be obtained in step S304. If the turning parameter is within the preset parameter range and the lock state signal is the second lock state signal, the locking signal may be sent to the electronic lock to lock the electronic lock.

In one or more embodiments of this specification, the turning parameter signal and the door state signal of the side-hinged door may be obtained so as to accurately determine an open or closed state of the side-hinged door according to the turning parameter signal and the door state signal. The turning parameter signal may be obtained by the turning detector disposed at the side-hinged door detecting the turning parameter of the door panel with respect to the door frame, the door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

Figure 8:
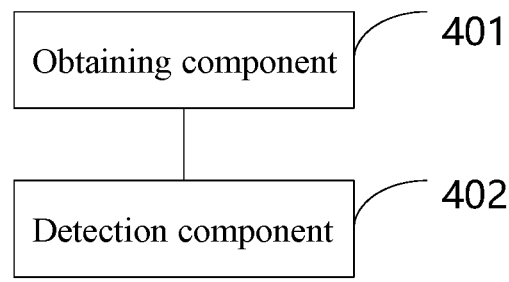
FIG. 8 is a block diagram showing components of an electronic door opening/closing detection apparatus provided by one or more embodiments of this specification.

In accordance with the electronic door opening/closing detection method described in the above FIGS. 5, 6, and 7, and based on the same technical concept, this specification further provides an electronic door opening/closing detection apparatus. FIG. 8 is a schematic diagram of a component composition of an electronic door opening/closing detection apparatus provided by one or more embodiments of this specification. The apparatus is used to implement the electronic door opening/closing detection method described in FIGS. 5, 6, and 7. As shown in FIG. 8, the apparatus may include an obtaining component 401 and a detection component 402.

The obtaining component 401 may be configured to obtain a turning parameter signal and a door state signal of the side-hinged door. The turning parameter signal may be obtained by a turning detector disposed at the side-hinged door detecting a turning parameter of a door panel of the side-hinged door with respect to a door frame of the side-hinged door. The door state signal may be generated by a position detector disposed at the side-hinged door, and the position detector may generate a first door state signal if a position-approaching condition is met, or generate a second door state signal if the position-approaching condition is not met.

The detection component 402 may be configured to determine the side-hinged door is in an open state or a closed state according to the turning parameter signal and the door state signal generated by the position detector.

In one or more embodiments of this specification, the turning parameter signal and the door state signal of the side-hinged door may be obtained so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door, the door state signal may be generated by the position detector disposed at the side-hinged door, and the position detector may generate the first door state signal if a position-approaching condition is met or generate the second door state signal if the position-approaching condition is not met. For the self-service vending device in the self-service vending scenario, malicious lock deception can be effectively prevented, and the interests of merchants can be protected.

In some embodiments, the turning detector may be disposed at a door shaft of the side-hinged door.

In some embodiments, the detection component 402 may determine that the side-hinged door is in a closed state when the turning parameter is within a preset parameter range and the position detector generates the first door state signal. The detection component 402 may determine that the side-hinged door is in an open state when the turning parameter is not within the preset parameter range and the position detector generates the second door state signal.

In some embodiments, the apparatus may further include an unlocking component.

The unlocking component may be configured to send an unlocking signal to the electronic lock to unlock the electronic lock upon receiving an unlocking request and determining that the electronic lock is locked and the side-hinged door is in a closed state.

In some embodiments, the apparatus may further include a locking component.

The locking component may be configured to send a locking signal to the electronic lock to lock the electronic lock upon receiving a locking request and determining that the electronic lock is unlocked and the side-hinged door is in a closed state.

In some embodiments, the obtaining component 401 may be further configured to: obtain a lock state signal. The lock state signal may be generated by a lock detector disposed at the side-hinged door or the electronic lock, and the lock detector may generate a first lock state signal if a bolt of the electronic lock is in an extended state, or generate a second lock state signal if the bolt of the electronic lock is in a retracted state.

Accordingly, the detection component 402 may determine an open or closed state of the side-hinged door according to the turning parameter signal, the door state signal generated by the position detector, and the lock state signal generated by the lock detector.

In some embodiments, the detection component 402 may determine that the side-hinged door is in a closed state when the turning parameter is within a preset parameter range, the position detector generates the first door state signal, and the lock detector generates the first lock state signal.

The detection component 402 may determine that the side-hinged door is in an open state when the turning parameter is not within the preset parameter range, the position detector generates the second door state signal and the lock detector generates the second lock state signal.

According to one or more embodiments of this specification, the electronic door opening/closing detection apparatus provided thereby can obtain the turning parameter signal and the door state signal of the side-hinged door, so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door. The door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

It should be noted that the embodiment related to the electronic door opening/closing detection apparatus in this specification and the embodiment related to the electronic door opening/closing detection method in this specification are based on the same inventive concept, such that for some implementations of this embodiment, one may refer to the implementations of the foregoing corresponding electronic door opening/closing detection method. Repetitions will not be elaborated herein.

Figure 9:
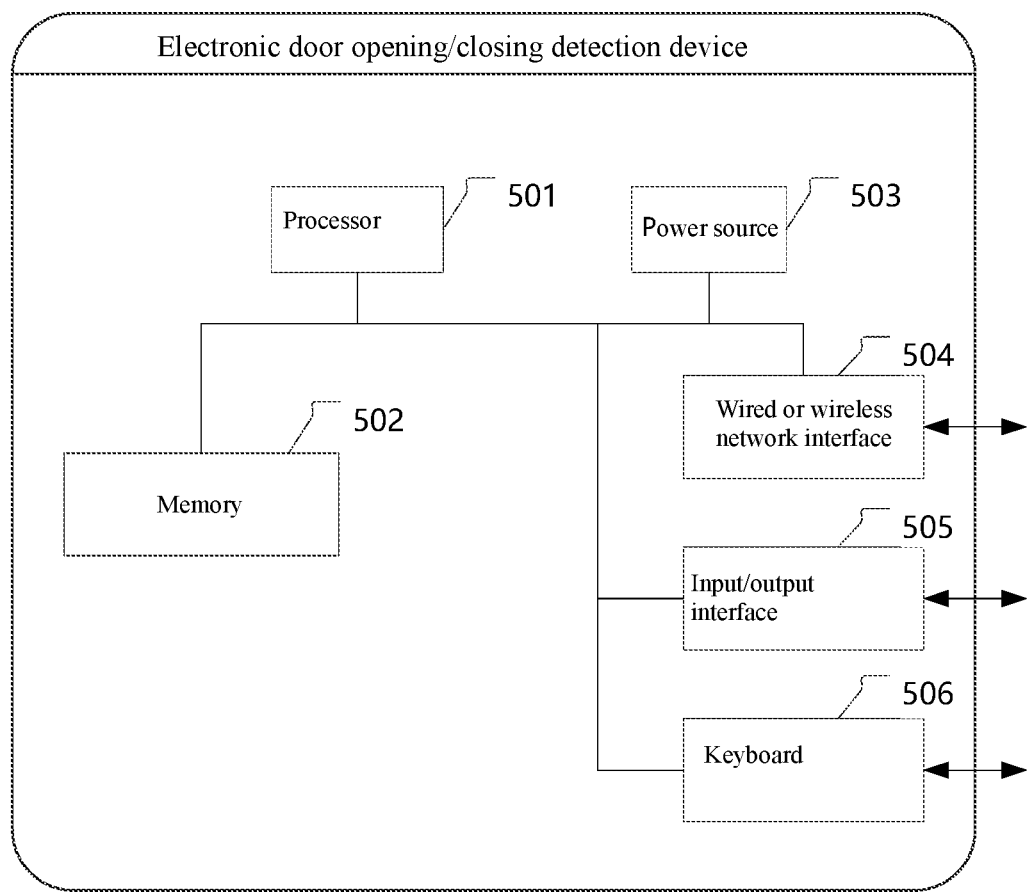
FIG. 9 shows a structural diagram of an electronic door opening/closing detection device provided by one or more embodiments of this specification.

Further, in accordance with the method shown in the above FIGS. 5, 6, and 7, and based on the same technical concept, this specification further provides an electronic door opening/closing detection device. The device is used to implement the above-described electronic door opening/closing detection method, as shown in FIG. 9.

The electronic door opening/closing detection devices might be implemented differently due to different configurations or performances. The electronic door opening/closing detection device may include one or more processors 501 and a memory 502. The memory 502 may store one or more storage application programs or data. Here, the memory 502 may be used for short-time storage or persistent storage. The application program stored in the memory 502 may include one or more components (not shown), and each component may include a series of computer executable instructions in the electronic door opening/closing detection device. Further, the processor 501 may be configured to communicate with the memory 502 and execute, on the electronic door opening/closing detection device, a series of computer executable instructions in the memory 502. The electronic door opening/closing detection device may further include one or more power sources 503, one or more wired or wireless network interfaces 504, one or more input/output interfaces 505, one or more keyboards 506, and the like.

In one embodiment, the electronic door opening/closing detection device may include a memory and one or more programs. The one or more programs may be stored in the memory, and may comprise one or more components. Each component may include a series of computer executable instructions for the electronic door opening/closing detection device, and each component may be configured to enable the one or more processors to execute the one or more programs comprises computer executable instructions.

The computer executable instructions may include obtaining a turning parameter signal and a door state signal of the side-hinged door. The turning parameter signal may be obtained by a turning detector disposed at the side-hinged door detecting a turning parameter of a door panel of the side-hinged door with respect to a door frame of the side-hinged door. The door state signal may be a first door state signal or a second door state signal. The door state signal may be generated by a position detector disposed at the side-hinged door, and the position detector may generate a first door state signal if a position-approaching condition is met, or generate a second door state signal if the position-approaching condition is not met.

The computer executable instructions may further include determining an open or closed state of the side-hinged door according to the turning parameter signal and the door state signal generated by the position detector.

In one or more embodiments of this specification, the turning parameter signal and the door state signal of the side-hinged door are obtained, so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door. The door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

In some embodiments, the turning detector may be disposed at a door shaft of the side-hinged door.

In some embodiments, when the computer executable instructions are executed, determining an open or closed state of the side-hinged door according to the turning parameter signal and the door state signal generated by the position detector may include: determining that the side-hinged door is in a closed state when the turning parameter is within a preset parameter range and the position detector generates the first door state signal; and determining that the side-hinged door is in an open state when the turning parameter is not within the preset parameter range and the position detector generates the second door state signal.

In some embodiments, when the computer executable instructions are executed, the following step may be further performed: upon receiving an unlocking request and determining that the electronic lock is locked and the side-hinged door is in a closed state, sending an unlocking signal to the electronic lock to unlock the electronic lock.

In some embodiments, when the computer executable instructions are executed, the following step may be further performed: upon receiving a locking request and determining that the electronic lock is unlocked and the side-hinged door is in a closed state, sending a locking signal to the electronic lock to lock the electronic lock.

In some embodiments, when the computer executable instructions are executed, the following step may be further performed: obtaining a lock state signal, wherein the lock state signal is generated by a lock detector disposed at the side-hinged door or the electronic lock, and the lock detector generates a first lock state signal when a bolt of the electronic lock is in an extended state, and generates a second lock state signal when the bolt of the electronic lock is in a retracted state.

The determining an open or closed state of the side-hinged door according to the turning parameter signal and the door state signal generated by the position detector may include: determining an open or closed state of the side-hinged door according to the turning parameter signal, the door state signal may be generated by the position detector, and the lock state signal may be generated by the lock detector.

In some embodiments, when the computer executable instructions are executed, the determining an open or closed state of the side-hinged door according to the turning parameter signal, the door state signal generated by the position detector, and the lock state signal generated by the lock detector may include: determining that the side-hinged door is in a closed state when the turning parameter is within a preset parameter range, the position detector generates the first door state signal, and the lock detector generates the first lock state signal; and determining that the side-hinged door is in an open state when the turning parameter is not within the preset parameter range, the position detector generates the second door state signal, and the lock detector generates the second lock state signal.

According to one or more embodiments of this specification, the electronic door opening/closing detection device provided thereby can obtain the turning parameter signal and the door state signal of the side-hinged door, so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door, the door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

It should be noted that the embodiment related to the electronic door opening/closing detection device in this specification and the embodiment related to the electronic door opening/closing detection method in this specification are based on the same inventive concept, such that for some implementations of this embodiment, one may refer to the implementations of the foregoing corresponding electronic door opening/closing detection method. Repetitions will not be elaborated herein.

Furthermore, in accordance with the method shown in the above FIGS. 5, 6, and 7, and based on the same technical concept, this specification further provides a storage medium, configured to store computer executable instructions. In an embodiment, the storage medium may be a USB flash disk, a compact disc, a hard disk, or the like. Upon being executed by a processor, the computer executable instructions stored in the storage medium may cause the processor to perform operations.

The operations may include: obtaining a turning parameter signal and a door state signal of the side-hinged door, wherein the turning parameter signal is obtained by a turning detector disposed at the side-hinged door detecting a turning parameter of a door panel of the side-hinged door with respect to a door frame of the side-hinged door, the door state signal is generated by a position detector disposed at the side-hinged door, and the position detector may generate a first door state signal if a position-approaching condition is met and generate a second door state signal if the position-approaching condition is not met; and determining an open or closed state of the side-hinged door according to the turning parameter signal and the door state signal generated by the position detector.

In one or more embodiments of this specification, the turning parameter signal and the door state signal of the side-hinged door may be obtained so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door. The door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

In some embodiments, the turning detector may be disposed at a door shaft of the side-hinged door.

In some embodiments, when the computer executable instructions stored in the storage medium are executed by the processor, the determining an open or closed state of the side-hinged door according to the turning parameter signal and the door state signal generated by the position detector may include: determining that the side-hinged door is in a closed state when the turning parameter is within a preset parameter range and the position detector generates the first door state signal; and determining that the side-hinged door is in an open state when the turning parameter is not within the preset parameter range and the position detector generates the second door state signal.

In some embodiments, when the computer executable instructions stored in the storage medium are executed by the processor, the following step may be further performed: upon receiving an unlocking request and determining that the electronic lock is closed and the side-hinged door is in a closed state, sending an unlocking signal to the electronic lock to unlock the electronic lock.

In some embodiments, when the computer executable instructions stored in the storage medium are executed by the processor, the following step may be further performed: upon receiving a locking request and determining that the electronic lock is open and the side-hinged door is in a closed state, sending a locking signal to the electronic lock to lock the electronic lock.

In some embodiments, when the computer executable instructions stored in the storage medium are executed by the processor, the following step may be further performed: obtaining a lock state signal, wherein the lock state signal is generated by a lock detector disposed at the side-hinged door or the electronic lock, and the lock detector generates a first lock state signal when a bolt of the electronic lock is in an extended state, and generates a second lock state signal when the bolt of the electronic lock is in a retracted state.

The determining an open or closed state of the side-hinged door according to the turning parameter signal and the door state signal generated by the position detector may include: determining an open or closed state of the side-hinged door according to the turning parameter signal, the door state signal generated by the position detector, and the lock state signal generated by the lock detector.

In some embodiments, when the computer executable instructions stored in the storage medium are executed by the processor, the determining an open or closed state of the side-hinged door according to the turning parameter signal, the door state signal generated by the position detector, and the lock state signal generated by the lock detector may include: determining that the side-hinged door is in a closed state when the turning parameter is within a preset parameter range, the position detector generates the first door state signal, and the lock detector generates the first lock state signal; and determining that the side-hinged door is in an open state when the turning parameter is not within the preset parameter range, the position detector generates the second door state signal, and the lock detector generates the second lock state signal.

When the computer executable instructions stored in the storage medium provided by one or more embodiments of this specification are executed by the processor, the turning parameter signal and the door state signal of the side-hinged door may be obtained, so as to accurately determine an open or closed state of the side-hinged door according to the turning parameter signal and the door state signal. The turning parameter signal may be obtained by a turning detector disposed at the side-hinged door detecting the turning parameter of the door panel of the side-hinged door with respect to the door frame of the side-hinged door. The door state signal may be generated by the position detector disposed at the side-hinged door, and the position detector may generate the first door state signal if a position-approaching condition is met, or generate the second door state signal if the position-approaching condition is not met. For the self-service vending device in the self-service vending scenario, malicious lock deception can be effectively prevented, and the interests of merchants can be protected.

It should be noted that the embodiment related to the storage medium in this specification and the embodiment related to the electronic door opening/closing detection method in this specification are based on the same inventive concept, such that for some implementations of this embodiment, one may refer to the implementations of the foregoing corresponding electronic door opening/closing detection method. Repetitions will not be elaborated herein.

In the 1950s, an improvement in technology can be clearly identified as a hardware improvement (for example, an improvement in a diode, a transistor, a switch, and other circuit structures), or a software improvement (for example, an improvement in a method flow). However, with the development of various technologies, an improvement to many method flows nowadays can also be considered as a direct improvement to a hardware circuit structure. Most of the design engineers obtain a corresponding hardware circuit structure by programming an improved method flow in a hardware circuit. Therefore, one cannot make the statement that an improvement in a method flow cannot be implemented in a physical hardware component. For example, a programmable logic device (PLD) (for example, a field programmable gate array, FPGA) is such an integrated circuit that the logic functions thereof are determined by programming the device. Design engineers can program and "integrate" a digital system in a PLD without having a manufacturer to design and manufacture a dedicated integrated circuit chip. Moreover, at present, instead of manually manufacturing an integrated circuit chip, the programming in most cases is achieved by using "logic compiler" software. The logic compiler is similar to a software compiler used for developing and compiling a program; and before compilation, the raw codes also need to be complied in a specific programming language, which is called hardware description language (HDL); furthermore, there are many types rather than only one type of HDL, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL), and the like. The most commonly used HDL at present is Very-High-Speed Integrated Circuit Hardware Description Language (VHDL) and Verilog. Those skilled in the art should appreciate that by simply performing logic programming on a method flow by using several of the above-described hardware description languages and programming the method flow in an integrated circuit, a hardware circuit for implementing the logic method flow can be obtained easily.

A controller can be implemented in any appropriate form; for example, the controller can be in the forms of a microprocessor or a processor, a computer-readable medium having stored therein a computer-readable program code (for example, software or hardware) which can be executed by the microprocessor/processor, a logic gate, a switch, an application specific integrated circuit (ASIC), a programmable logic controller, and an embedded micro-controller; the examples of controllers include, but are not limited to, the following micro-controllers: ARC 625D, Atmel AT91SAM, Microchip PIC18F26K20, and Silicone Labs C8051F320. A memory controller can also be implemented as a part of a memory control logic. Those skilled in the art should appreciate that besides the controller being implemented by using only computer-readable program codes, it is completely acceptable to perform logic programming on method steps to enable the controller to realize the same functions in the forms of a logic gate, a switch, a dedicated integrated circuit, a programmable logic controller, and an embedded micro-controller. Therefore, the controller can be considered as a hardware component; and the devices for realizing various functions included in the controller can also be considered as structures of the hardware component. In some embodiments, the devices for realizing various functions can be even considered as a software component for implementing a method, and also a structure of the hardware component.

Systems, apparatuses, components, or units described in the above-described embodiments may be implemented by computer chips or entities, or by products with a certain function. A typical implementation device is a computer. For example, the computer, can be a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the above apparatuses are described on the basis of respective function of each unit thereof. Naturally, when the present specification is implemented, the functions of the units can be implemented in the same one or more software and/or hardware.

Those skilled in the art should appreciate that the embodiment of the present specification can be embodied as a method, a system or a computer program product. Therefore, the present specification can take the form of an entirely hardware embodiment, an entirely software embodiment or an embodiment combining hardware and software elements. Furthermore, the present specification can take the form of a computer program product embodied in one or more computer usable storage media including computer usable program codes therein (including, but not limited to, a magnetic disk storage, a CD-ROM, an optical memory, and the like).

The present specification is described with reference to the flow charts and/or block diagrams of the method, device (system), and computer program product according to the embodiments of this specification. It should be understood that each flow and/or block in the flow charts and/or the block diagrams, and a combination of the flows and/or the blocks in the flow charts and/or the block diagrams can be implemented via computer program instructions. The computer program instructions may also be loaded onto a general-purpose computer, a specialized computer, an embedded processor, or the processors of other programmable data processing devices to produce a computer such that the instructions which are executed on the computer or other processors of the programmable apparatus generate a device for implementing the functions specified in one or more flows in a flow chart and/or one or more blocks in a block diagram.

The computer program instructions can also be stored in a computer readable memory which can boot a computer or other programmable data processing devices to operate in a specific manner, such that the instructions stored in the computer readable memory generate a product comprising an instruction apparatus, wherein the instruction apparatus is configured to realize the functions specified in one or more flows in a flow chart and/or one or more blocks in a block diagram.

The computer program instructions can also be loaded to a computer or other programmable data processing devices, so as to execute a series of operation steps on the computer or the other programmable devices to generate a computer reliable process, such that the instructions executed on the computer or the other programmable devices can provide steps for implementing the functions specified in one or more flows in a flow chart and/or one or more blocks in a block diagram.

In a typical configuration, a computing device comprises one or more processors (CPU), an input/output interface, a network interface, and an internal memory.

The internal memory may comprise a volatile memory on a computer readable medium, a random access memory (RAM), and/or a non-volatile memory, such as a read-only memory (ROM), or a flash memory (flash RAM). The internal memory is an example of the computer readable medium.

The computer readable medium includes non-volatile, volatile, removable, and non-removable media which can store information by any methods or technologies. The information can be a computer readable instruction, a data structure, a program module, or other data. The examples of the computer storage medium include, but are not limited to, a phase-change random access memory (PRAM), a static random access memory (SRAM), a dynamic random access memory (DRAM), other types of random access memories (RAM), a read-only memory (ROM), an electrically-erasable programmable read-only memory (EEPROM), a flash memory or other memory technologies, a read-only compact disk read-only memory (CD-ROM), a digital video disk (DVD) or other optical memories, a cassette type magnetic tape, a magnetic tape, a magnetic disk memory or other magnetic storage devices, or any other non-transmission medium. The computer storage medium can be configured to store information which can be accessed by the computing device. According to the definition of this specification, the computer readable medium does not include a transitory media, such as a modulated data signal or a carrier.

It should be further noted that the terms "comprise", "include" or any other variant thereof is intended to be non-exclusive, and therefore a process, method, commodity or device comprising a series of elements include not only the elements, but also other elements are not listed explicitly or the elements inherent in the process, method, commodity, or device. Unless more limitations are stated, the element defined by the sentence "comprising a . . . " does not exclude the situation that the process, method, commodity or device comprising the element further comprises another same element.

Those skilled in the art should appreciate that the embodiments of the present specification can be embodied as a method, a system, or a computer program product. Therefore, the present specification can take the form of an entirely hardware embodiment, an entirely software embodiment or an embodiment combining hardware and software elements. Furthermore, the present specification can take the form of a computer program product which can be executed by one or more computer usable storage mediums including computer usable program codes therein (including, but not limited to, a magnetic disk storage, a CD-ROM, an optical memory, and the like).

The present specification can be described in a general context of a computer executable instruction executed by a computer, for example, a program module. Generally, the program module comprises a routine, a program, an object, an assembly, a data structure for executing a specific task or for implementing a specific abstract type of data. The present specification can also be implemented in a distributed computation environment; and in the distributed computation environment, a task is executed by a remote processing device connected via a communication network. In the distributed computation environment, the program module can be located in a local and a remote computer storage mediums comprising a storage medium.

The embodiments of this specification are all described in a progressive manner; the same or similar parts in the embodiments can refer to each other; and each embodiment emphasizes a point different from other embodiments. Particularly, the system embodiments are basically similar to the method embodiments, and are thus described in a more concise manner. The relevant portions can refer to the descriptions in the method embodiments.

The descriptions above are only embodiments of the present specification, but not intended to limit the present specification. For those skilled in the art, the present invention may have various modifications and variations. Any modifications, equivalent substitutions, improvements, and the like within the spirit and principles of the present specification shall fall within the scope of the claims of the present specification.

The invention claimed is:

1. An electronic door opening/closing apparatus, applicable to a side-hinged door, comprising:
an electronic lock, disposed at the side-hinged door and configured to limit a turn of a door panel of the side-hinged door when the electronic lock is locked;
a turning detector, disposed at the side-hinged door, and configured to detect a turning parameter of the door panel of the side-hinged door with respect to a door frame of the side-hinged door so as to generate a turning parameter signal;
a position detector, disposed at the side-hinged door, and configured to generate a first door state signal if a position-approaching condition is met, or generate a second door state signal if the position-approaching condition is not met; and a main controller, configured to determine, according to the turning parameter signal and the first or the second door state signal generated by the position detector, whether the side-hinged door is in an open state or a closed state, wherein the main controller is further configured to, upon receiving an unlocking request and determining that the electronic lock is locked and the side-hinged door is in the closed state, send an unlocking signal to the electronic lock to unlock the electronic lock.

2. The apparatus of claim 1, wherein the turning detector is disposed at a door shaft of the side-hinged door.

3. The apparatus of claim 1, wherein the main controller is configured to:
  determine, in response to the turning parameter being within a preset parameter range and the first door state signal being generated by the position detector, that the side-hinged door is in the closed state, or,
  determine, in response to the turning parameter being not within the preset parameter range and the second door state signal being generated by the position detector, that the side-hinged door is in the open state.

4. The apparatus of claim 1, wherein the main controller is configured to, upon receiving a locking request and determining that the electronic lock is unlocked and the side-hinged door is in the closed state, send a locking signal to the electronic lock to lock the electronic lock.

5. The apparatus of claim 1, wherein the position detector comprises a magnetic detector including:
  a magnetic sensor disposed at the door frame of the side-hinged door or a physical body comprising the electronic door opening/closing apparatus; and
  a magnetic panel disposed at the door panel of the side-hinged door,
  wherein the magnetic detector is configured to generate the first door state signal if a distance between the magnetic sensor and the magnetic panel is smaller than a preset distance, or the second door state signal if the distance between the magnetic sensor and the magnetic panel is not smaller than the preset distance.

6. The apparatus of claim 1, further comprising a lock detector,
  wherein the lock detector is disposed at the side-hinged door or the electronic lock, and is configured to generate a first lock state signal if a bolt of the electronic lock is in an extended state, or generate a second lock state signal if the bolt of the electronic lock is in a retracted state, and
  wherein the main controller is configured to determine, according to the turning parameter signal, the first or the second door state signal generated by the position detector, and the first or the second lock state signal generated by the lock detector, whether the side-hinged door is in the open state or the closed state.

7. The apparatus of claim 6, wherein the main controller is configured to:
  determine, in response to the turning parameter being within a preset parameter range, the first door state signal being generated by the position detector, and the first lock state signal being generated by the lock detector, that the side-hinged door is in the closed state, or,
  determine, in response to the turning parameter being not within the preset angle range, the second door state signal being generated by the position detector, and the second lock state signal being generated by the lock detector, that the side-hinged door is in the open state.

8. An electronic door opening/closing detection method, applicable to a side-hinged door with an electronic lock, the method comprises:
  obtaining a turning parameter signal and a door state signal of the side-hinged door, wherein the door state signal is a first door state signal or a second door state signal, and wherein the turning parameter signal is generated from a turning detector disposed at the side-hinged door and configured to detect a turning parameter of a door panel of the side-hinged door with respect to a door frame of the side-hinged door, the door state signal is generated from a position detector disposed at the side-hinged door, and configured to generate the first door state signal if a position-approaching condition is met, or generate the second door state signal if the position-approaching condition is not met;
  determining, according to the turning parameter signal and the door state signal generated by the position detector, that the side-hinged door is in an open state or a closed state; and
  sending, upon receiving an unlocking request and determining that the electronic lock is locked and the side-hinged door is in the closed state, an unlocking signal to the electronic lock to unlock the electronic lock.

9. The method of claim 8, wherein the turning detector is disposed at a door shaft of the side-hinged door.

10. The method of claim 8, wherein the determining, according to the turning parameter signal and the door state signal generated by the position detector, that the side-hinged door is in an open state or a closed state comprises:
  determining, in response to the turning parameter being within a preset parameter range and the first door state signal being generated by the position detector, that the side-hinged door is in the closed state, or
  determining, in response to the turning parameter being not within the preset parameter range and the second door state signal being generated by the position detector, that the side-hinged door is in the open state.

11. The method of claim 8, further comprising:
  upon receiving a locking request and determining that the electronic lock is unlocked and the side-hinged door is in the closed state, sending a locking signal to the electronic lock to lock the electronic lock.

12. The method of claim 8, further comprising:
  obtaining a lock state signal including a first lock state signal or a second lock state signal, wherein the lock state signal is generated by a lock detector disposed at the side-hinged door or the electronic lock, and configured to generate the first lock state signal if a bolt of the electronic lock is in an extended state, or generate the second lock state signal if the bolt of the electronic lock is in a retracted state,
  wherein the determining, according to the turning parameter signal and the door state signal generated by the position detector, that the side-hinged door is in an open state or a closed state comprises:
  determining, according to the turning parameter signal, the door state signal generated by the position detector, and the lock state signal generated by the lock detector, that the side-hinged door is in the open state or the closed state.

13. The method according to claim 12, wherein the determining, according to the turning parameter signal, the door state signal generated by the position detector, and the lock state signal generated by the lock detector, that the side-hinged door is in the open state or the closed state comprises:
  determining, in response to the turning parameter being within a preset parameter range, the first door state signal being generated by the position detector, and the first lock state signal being generated by the lock detector, that the side-hinged door is in the closed state, or,
  determining, in response to the turning parameter being not within the preset parameter range, the second door state signal being generated by the position detector, and the second lock state signal being generated by the lock detector, that the side-hinged door is in the open state.

14. An electronic door opening/closing detection apparatus, applicable to a side-hinged door with an electronic lock, wherein the apparatus includes one or more processors and a non-transitory computer-readable storage medium storing a computer program executable by the one or more processors, wherein, upon being executed by the one or more processors, the computer program causes the one or more processors to perform operations comprising:
  obtaining a turning parameter signal and a door state signal of the side-hinged door, wherein the door state signal is a first door state signal or a second door state signal, and wherein the turning parameter signal is generated from a turning detector disposed at the side-hinged door and configured to detect a turning parameter of a door panel of the side-hinged door with respect to a door frame of the side-hinged door, the door state signal is generated from a position detector disposed at the side-hinged door, and configured to generate the first door state signal if a position-approaching condition is met, or generate the second door state signal if the position-approaching condition is not met;
  determining, according to the turning parameter signal and the door state signal generated by the position detector, that the side-hinged door is in an open state or a closed state; and
  sending, upon receiving an unlocking request and determining that the electronic lock is locked and the side-hinged door is in the closed state, an unlocking signal to the electronic lock to unlock the electronic lock.

15. The apparatus of claim 14, wherein the turning detector is disposed at a door shaft of the side-hinged door.

16. The apparatus of claim 14, wherein the determining, according to the turning parameter signal and the door state signal generated by the position detector, that the side-hinged door is in an open state or a closed state comprises:
  determining, in response to the turning parameter being within a preset angle range and the first door state signal being generated by the position detector, that the side-hinged door is in the closed state, or
  determining, in response to the turning parameter being not within the preset angle range and the second door state signal being generated by the position detector, that the side-hinged door is in the open state.

17. The apparatus of claim 14, wherein the operations further comprises:
  upon receiving a locking request and determining that the electronic lock is unlocked and the side-hinged door is in the closed state, sending a locking signal to the electronic lock to lock the electronic lock.

* * * * *